United States Patent
Jaśkiewicz et al.

(10) Patent No.: US 11,047,403 B2
(45) Date of Patent: Jun. 29, 2021

(54) HYDRAULIC SERVO VALVE

(71) Applicant: Hamilton Sundstrand Corporation, Charlotte, NC (US)

(72) Inventors: Zbigniew Jaśkiewicz, Wrocław (PL); Sebastian Szymański, Wrocław (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 9 days.

(21) Appl. No.: 16/545,327

(22) Filed: Aug. 20, 2019

(65) Prior Publication Data

US 2020/0056636 A1 Feb. 20, 2020

(30) Foreign Application Priority Data

Aug. 20, 2018 (EP) ..................... 18461601

(51) Int. Cl.
| | |
|---|---|
| F15B 13/04 | (2006.01) |
| F15B 15/20 | (2006.01) |
| F15B 13/044 | (2006.01) |
| F16K 31/124 | (2006.01) |
| F15B 13/043 | (2006.01) |
| F15B 18/00 | (2006.01) |

(52) U.S. Cl.
CPC .......... F15B 15/204 (2013.01); F15B 13/044 (2013.01); F16K 31/124 (2013.01); F15B 13/0431 (2013.01); F15B 18/00 (2013.01)

(58) Field of Classification Search
CPC ................ F15B 13/0436; F15B 15/204; F15B 13/0435; F15B 13/044
USPC .......................................... 137/625.6, 625.64
See application file for complete search history.

(56) References Cited

U.S. PATENT DOCUMENTS

| | | | |
|---|---|---|---|
| 3,217,728 A | 11/1965 | Pegram | |
| 3,405,727 A * | 10/1968 | Hill | ..................... F15B 13/0436 137/83 |
| 5,314,118 A | 5/1994 | Lembke | |
| 2015/0369381 A1 | 12/2015 | Rodegheri et al. | |
| 2017/0328383 A1* | 11/2017 | Neef | ................... F15B 13/0889 |

FOREIGN PATENT DOCUMENTS

| | | |
|---|---|---|
| CN | 102720879 A | 10/2012 |
| DE | 102008001647 A1 | 11/2009 |
| DE | 102013218032 A1 | 3/2015 |

(Continued)

OTHER PUBLICATIONS

Original and Translation of CN 102720879 A; Xiaolong Hu, Yan Li, Zhanchun Zhang, Xiaolei Guo, Xiaojun Li; Oct. 10, 2020.*

(Continued)

*Primary Examiner* — Paul J Gray
(74) *Attorney, Agent, or Firm* — Cantor Colburn LLP

(57) ABSTRACT

A hydraulic servo valve comprising a pair of opposing receiving ports, a piston disposed between the pair of opposing receiving ports and an actuator in contact with the piston. The actuator is configured to provide axial movement of the piston in response to being actuated. The piston comprises a pair of opposed openings that are in operable fluid communication with a respective one of each of the receiving ports, and the axial movement of the piston is configured to vary the amount of a fluid pressure communicated between a respective one of the openings and receiving ports.

14 Claims, 5 Drawing Sheets

(56) References Cited

FOREIGN PATENT DOCUMENTS

| | | |
|---|---|---|
| GB | 1423361 A | 2/1976 |
| JP | H06213354 A | 8/1994 |
| WO | 0159306 A1 | 8/2001 |

OTHER PUBLICATIONS

Extended European Search Report for International Application No. 18461601.9 dated Feb. 21, 2019, 9 pages.

* cited by examiner

HYDRAULIC SERVO VALVE

FOREIGN PRIORITY

This application claims priority to European Patent Application No. 18461601.9 filed Aug. 20, 2018, the entire contents of which is incorporated herein by reference.

TECHNICAL FIELD

This disclosure relates generally to a hydraulic servo valve.

BACKGROUND

Servo valves are generally used when accurate position control is required, such as, for example, control of a primary flight surface. Servo valves can be used to control hydraulic actuators or hydraulic motors. They are common in industries which include, but are not limited to, automotive systems, aircraft and the space industry.

A known type of hydraulic servo valve is a jet pipe arrangement. In this arrangement, the primary components in the servo valve are the torque motor, jet pipe and one or more servos.

FIG. 1 shows generally a known arrangement of a hydraulic servo valve 10. The hydraulic servo valve 10 shown in FIG. 1 represents a jet pipe type arrangement as discussed above. The primary components of the jet pipe type arrangement are the jet tube 101 for receiving a supply pressure, an armature 102 connected to the jet pipe 101, and an electromagnet 105 surrounding the armature 102. In known arrangements, the jet pipe 101 and the armature 102 are separate components. An electrical input (not shown) is connected to the electromagnet 105. When an electrical current is supplied to the electromagnet 105, the armature 102 changes position due to electromagnetic forces supplied by the electromagnet 105. The jet pipe arrangement shown in FIG. 1 may be contained within a housing 106.

In the example shown, the armature 102 is connected in a perpendicular manner to the jet pipe 101, or is an integral part of the jet pipe 101—the integral part being perpendicular to the jet pipe 101. The electromagnet 105 provides a torque that is proportional to the electrical current that is provided by the electrical input. The armature 102 may include coils (not shown) and the electromagnet 105 consists of a set of permanent magnets (not shown) surrounding the armature 102. When a current is applied to the armature 102, magnetic flux acting on the ends of the armature 102 is developed. The direction of the magnetic flux (force) depends on the sign (direction) of the current. The magnetic flux will cause the armature tips (102a, 102b) to be attracted to the electromagnet 105 (current direction determines which magnetic pole is attracting and which one is repelling). This magnetic force creates an applied torque on the jet pipe 101, which is proportional to applied current. The jet pipe 101 rotates and interacts with a spool portion (shown generally as 107 in FIG. 1).

The primary components of the spool portion 107 are receivers 108a and 108b that are in fluid communication with chambers 104a and 104b. There is also provided a spool 103 which is movable between chambers 104a and 104b. The movement of the spool 103 is accurately controlled by the jet pipe 101 and the pressure provided in chambers 104a and 104b.

The hydraulic servo valve 10 also includes a supply pressure inlet flexible tube 111 connected to a supply pressure inlet 109 that provides fluid into the flexible tube 111. The fluid passes through a filter 112 and then through jet pipe 101. At the end of the jet pipe 101 is a nozzle 113.

In use, the jet pipe 101 converts kinetic energy of moving fluid into static pressure. When the jet pipe 101 is centred between the receivers 108a and 108b, the pressure on the spool 103 is equal. However, when the jet pipe 101 is rotated by the armature 102 and electromagnet 105 toward one of the receivers—say 108a, the pressure at this receiver 108a is greater than the other receiver 108b. This creates a load imbalance on the servo 103 causing the spool 103 to move. If, for example, the jet pipe 101 is rotated toward the receiver 108a, this could cause the spool 103 to move to the right and into chamber 104b, as the pressure would be greater in chamber 104a, and the pressure would be decreased in chamber 104b. As the spool 103 moves from a null position—i.e., when the pressure is equal in chambers 104a and 104b—outlets 110a and 110b can control pressure in an actuator (not shown). The actuator part of the servo valve has the same characteristics as any known hydraulic actuator.

Although the type of arrangement shown in FIG. 1 can be effective at controlling the position of the jet pipe 101 and the spool 103, it has been found that limitations nevertheless exist. For example, various operating parameters of the servo valve may deteriorate in use (e.g., due to sensitive moving parts, such as the armature and the jet pipe, which may also absorb energy from the torque motor).

There is a desire to provide a means of moving the spool of a servo valve that is robust and can maintain operational parameters (e.g., operating frequency and pressure) throughout its service life.

SUMMARY

The present disclosure relates to a hydraulic servo valve. The servo valve comprising a hydraulic servo valve, a valve chamber, a pair of fluid receiving ports, a member disposed between the pair of ports and movable within the valve chamber along an axis, and an actuator configured to move the member within the valve chamber along the axis. The member comprises a pair of openings, each facing a respective one of the ports to permit fluid to flow from the valve chamber to the ports via the openings in use. A fluid pressure at each of the ports is dependent upon an alignment of each of the openings with a respective one of the ports. Movement of the member along the axis by the actuator is configured to move the openings into and out of alignment with the ports to vary the fluid pressure at each of the fluid receiving ports.

In one embodiment of the above hydraulic servo valve, the actuator is a piezoelectric actuator, for example, a piezoelectric stack.

In a further embodiment of any of the above hydraulic servo valves, the openings have respective central axes that are parallel to each other, but are axially offset from each other by an axial distance relative to the axis. In this embodiment, the opposing receiving ports are co-axial with each other.

In an alternative embodiment of the above hydraulic servo valve, the receiving ports have respective central axes that are parallel to each other, but are axially offset from each other by an axial distance relative to the axis. In this embodiment, the opposing openings are co-axial with each other.

In a further embodiment of any of the above hydraulic servo valves, the servo valve further comprises an electrical input in electrical communication with the actuator, wherein the electrical input is controllable to selectively actuate the actuator.

In a further embodiment of any of the above hydraulic servo valves, the servo valve further comprises a resilient member in contact with the movable member and configured to bias the movable member against the action of the actuator.

In a further embodiment of any of the above hydraulic servo valves, the actuator is fixedly attached to the movable member. In a further embodiment, the attachment is provided by a solder joint or a weld between the actuator and the movable member.

In a further embodiment of any of the above hydraulic servo valves, the movable member comprises a first wall forming a closed end of the movable member and a second wall extending axially from the first wall to define a cavity therebetween and an open end axially opposing the closed end. In a further embodiment, the first and second walls form a U-shaped cross-section.

In a further embodiment of any of the above hydraulic servo valves, the servo valve further comprises a spool located within a spool cavity and between a first spool chamber and a second spool chamber, a supply pressure inlet and a supply line connecting the supply pressure inlet and the valve chamber. The first spool chamber and the second spool chamber are of varying volume based on the position of the spool within the spool cavity, and each port is fluidly connected to a respective one of the first and second spool chambers, such that, in use, when the actuator is actuated, the spool moves within the spool cavity to vary the volume of the first and second spool chambers in response to fluid pressure communicated from the ports. In a further embodiment, the servo valve further comprises a return line, and at least one return control orifice disposed in the return line. The at least one return control orifice comprises a constriction that is configured to control a fluid pressure in the return line.

In a further embodiment of either of the above hydraulic servo valves, a supply control orifice is disposed in the supply line and the supply control orifice comprises a constriction that is configured to control a fluid pressure in the supply line. In a further embodiment, the constriction of the control orifice is adjustable, for example, by comprising an adjustable nozzle.

In a further embodiment of any of the above hydraulic servo valves, the servo valve further comprises a housing containing the actuator, member and valve chamber.

BRIEF DESCRIPTION OF THE DRAWINGS

FIG. 2b shows a magnified view of a portion of the servo valve of FIG. 2a.

FIG. 3b shows a magnified view of a portion of the servo valve of FIG. 3a.

DETAILED DESCRIPTION

FIGS. 2a to 3b show a hydraulic servo valve 20 in accordance with an embodiment of the present disclosure.

Figure 1:
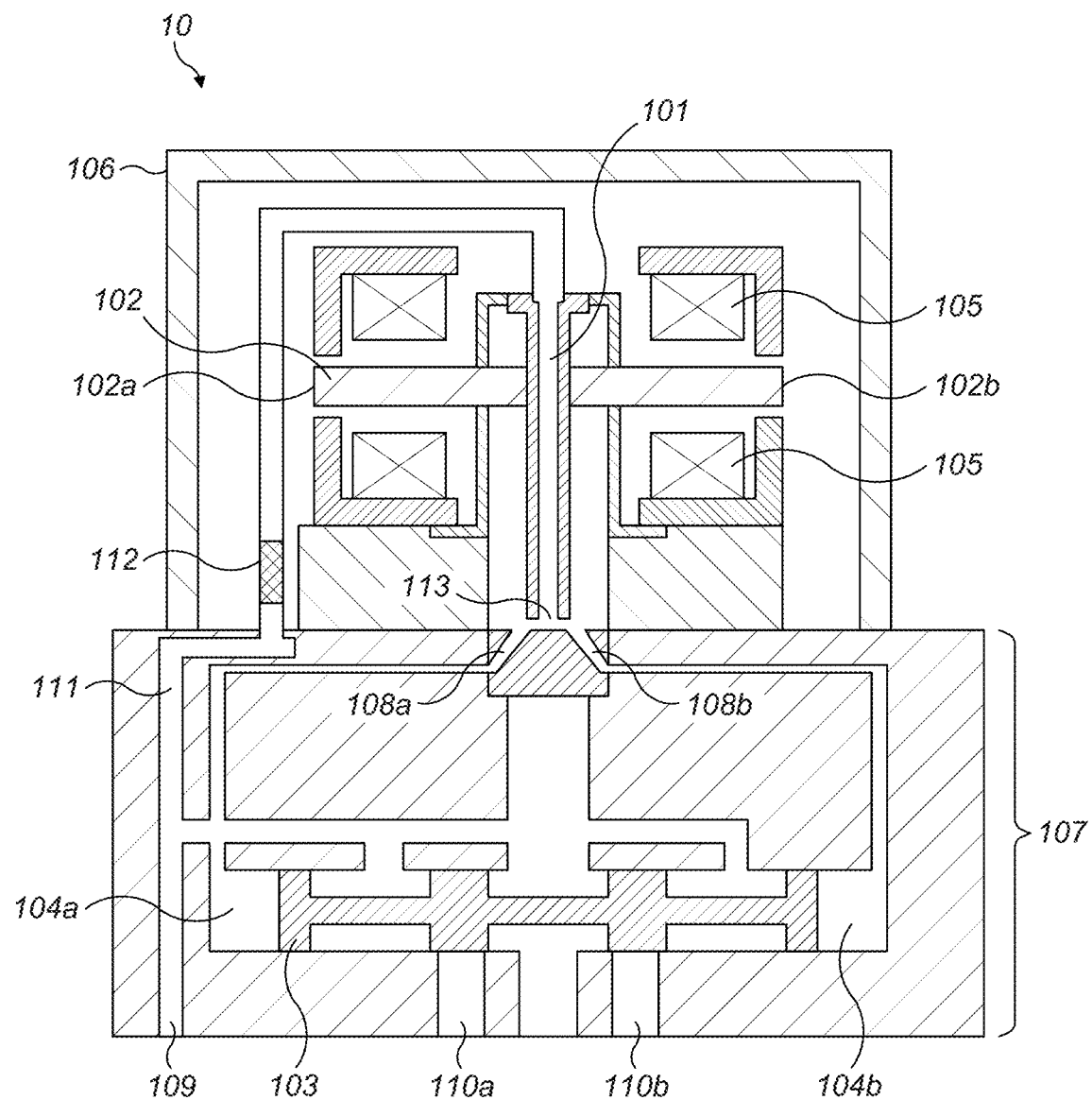
FIG. 1 shows a known arrangement of a servo valve.

The hydraulic servo valve 20 shown in FIGS. 2a to 3b replaces the jet pipe arrangement of FIG. 1 with an alternative means of moving a spool 203.

In the embodiments of FIGS. 2a to 3b, the servo valve 20 comprises a movable member (e.g., piston) 201. The piston 210 comprises a substantially cylindrical wall 201c extending around a longitudinal axis C of the piston 210, and extending in an axial direction from the closed end 201a to the open end 201b. A cavity 217 is defined by the volume within the cylindrical wall 201c. The closed end 201a defines a first axial end of the piston 201 and the open end 201b defines a second, opposing axial end of the piston 201.

The piston 201 is received within a valve chamber 215, and is axially movable therein parallel to axis C. Fluid is supplied to the chamber 215 and piston 201 by supply line 211, via a supply inlet 209a and a control orifice 211a. The piston 201 comprises a pair of opposed openings 213a, 213b extending through the cylindrical wall 201c, and which allow fluid communication to a respective one of receivers 208a, 208b (as discussed in more detail below). Each opening 213a, 213b has a respective central axis $O_A$, $O_B$.

In the depicted embodiment, the piston 201 and chamber 215 are generally cylindrical, and the openings 213a, 213b are diametrically opposed across the piston 201 (i.e., radially opposed across axis C). As depicted, the cross-section formed by the walls 201a and 201c of the piston 201 is generally U-shaped. Nonetheless, any other suitable shape of chamber, piston and opening could be used within the scope of this disclosure.

Piston 201 is disposed between a pair of opposing receivers 208a, 208b. The depicted receivers 208a, 208b are ports or nozzles with an inlet opening therein, although any suitable shape or type of receiver may be used. Receivers 208a, 208b act in the same manner as the receivers 108a, 108b of FIG. 1, and are part of a spool portion 207 of the servo valve 20 that also includes a spool cavity 204 with a spool 203 movable therein, with spool chambers 204a, 204b defined at opposing ends thereof. In this manner, fluid pressure imbalances caused by fluid communicated from openings 213a 213b to receivers 208a, 208b allows accurate control of the movement of the spool 203, by varying the pressure provided in chambers 204a and 204b.

In addition to the components shown in FIG. 1, the embodiments of FIGS. 2a to 3b also include respective springs 203a, 203b in chambers 204a and 204b, which provide a bias on the spool 203 back towards a neutral position. In this manner, springs 203a, 203b can help meter the spool 203 movement and force it to return to the neutral position when pressure imbalances in the chambers 204a and 204b are removed.

Servo valve 20 also includes return line 214 and return port 209b that allow communication of supply fluid pressure to a return circuit (not shown). Control orifices 214a and 214b are provided in the return line 214 and provide a constriction in the return line 214 that allows calibration of the supply fluid pressure to calibrate the degree of spool movement for a given pressure imbalance. The aforementioned orifice 211a in the supply line 211 is also used for similar constriction and calibration of the supply fluid pressure in the supply line 211. The size of the constriction provided by the orifices 211a, 214a, 214b is adjusted and is set before during initial servo valve calibration i.e., before operational use. For example, the installer has a set of nozzles of varying inner diameter that can be inserted into the orifices to achieve a desired constriction size. Alternatively, a nozzle with an adjustable opening size may be inserted into the orifices. Nozzles may be held in the orifices, for instance, by threaded engagement or press-fit. As the skilled person will understand, the constriction size necessary would be known depending on the design requirements of a particular servo valve in a particular application and operating environment.

Figure 2A:
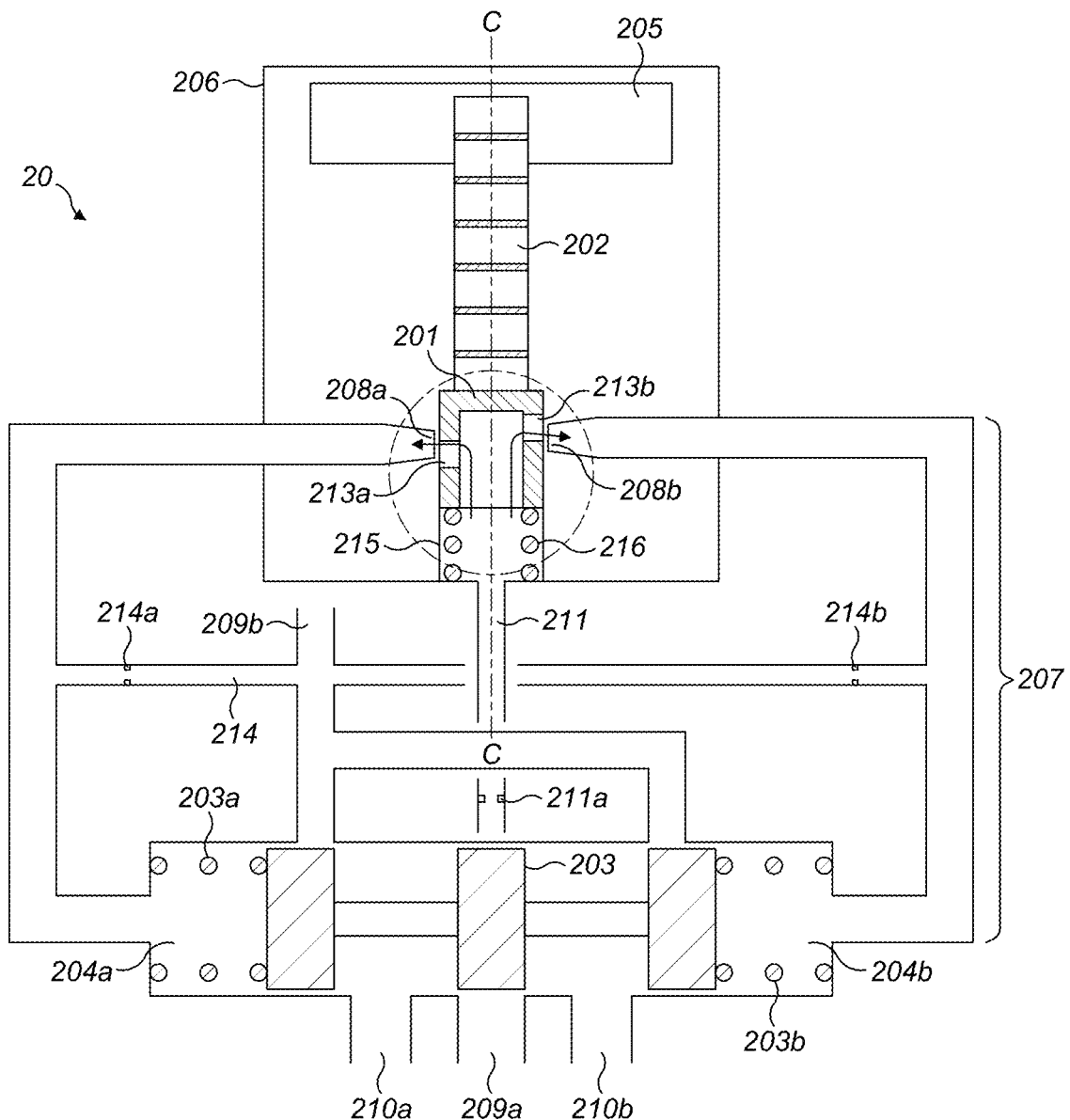
FIG. 2a shows an example of a servo valve in accordance with the present disclosure in a neutral (or null) position.
Figure 2B:
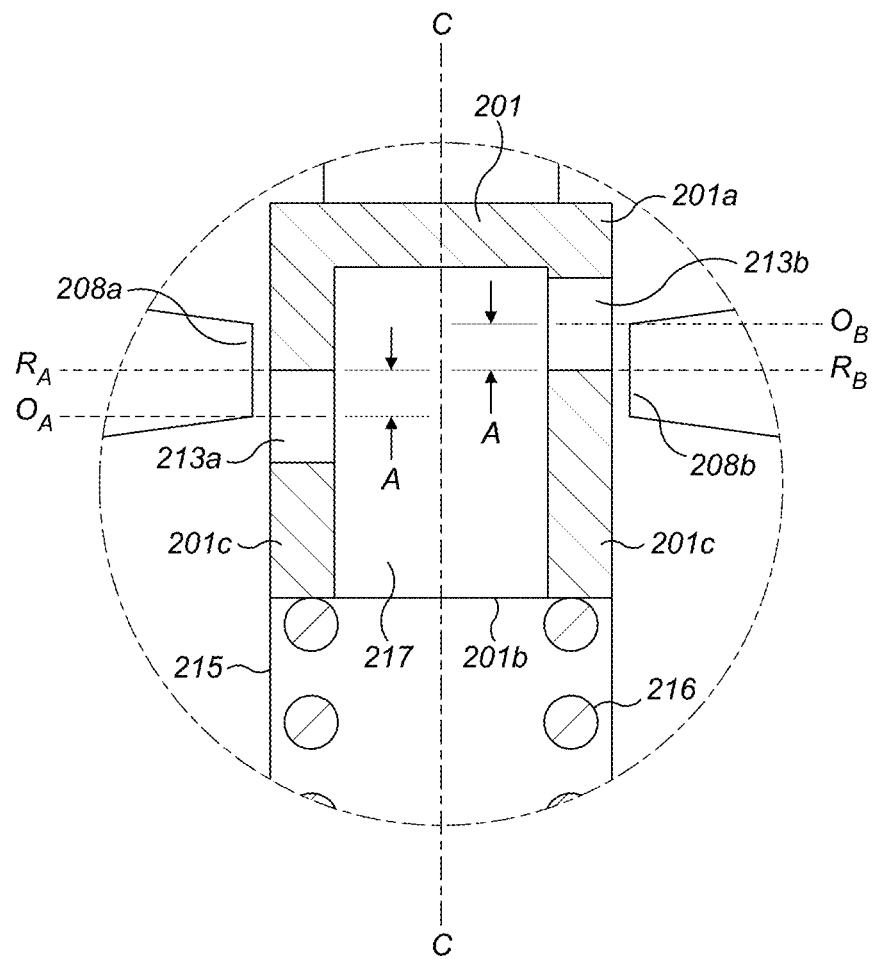
Figure 3A:
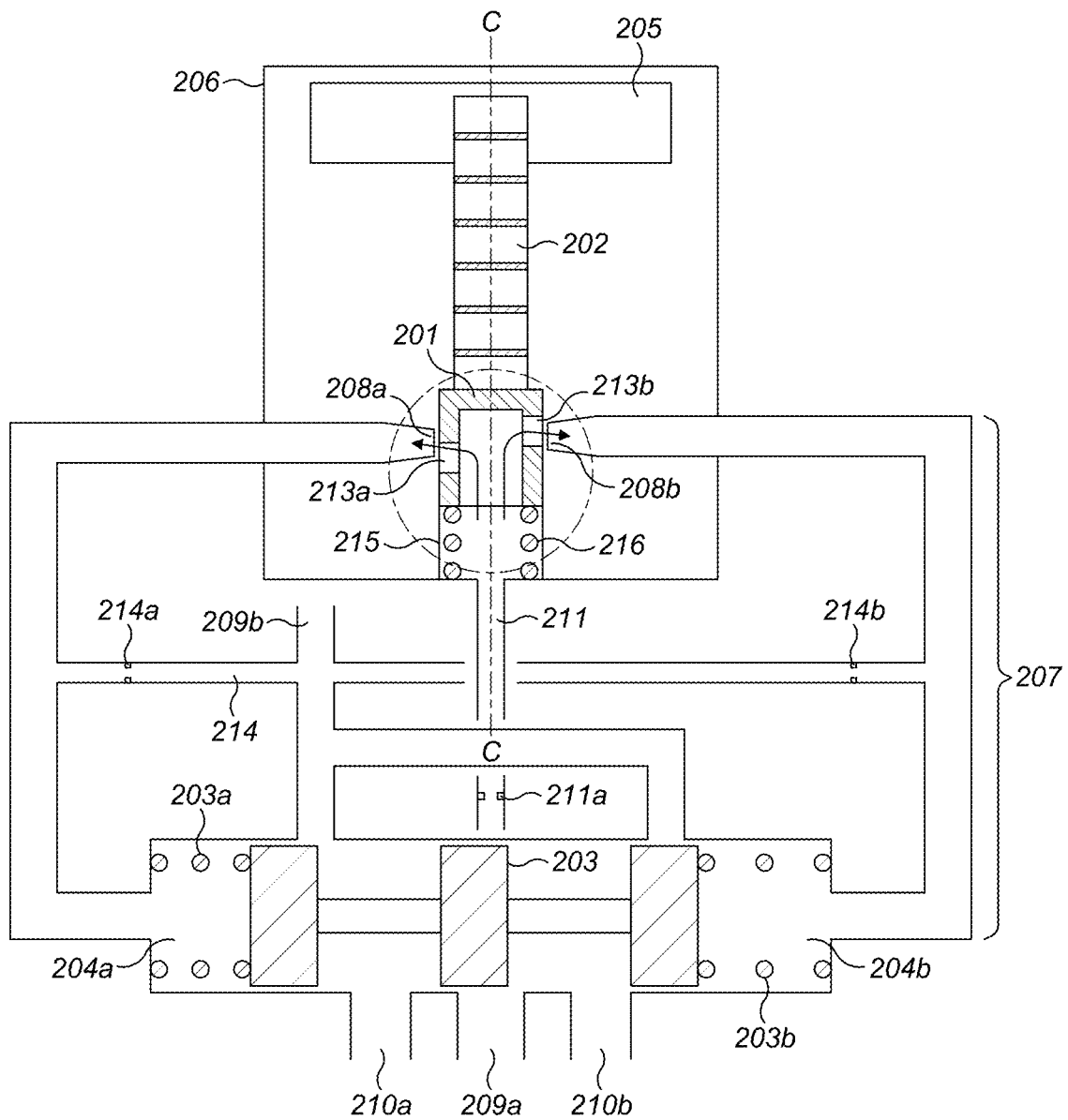
FIG. 3a shows an example of the servo valve of FIG. 2a in a pressure imbalance position.
Figure 3B:
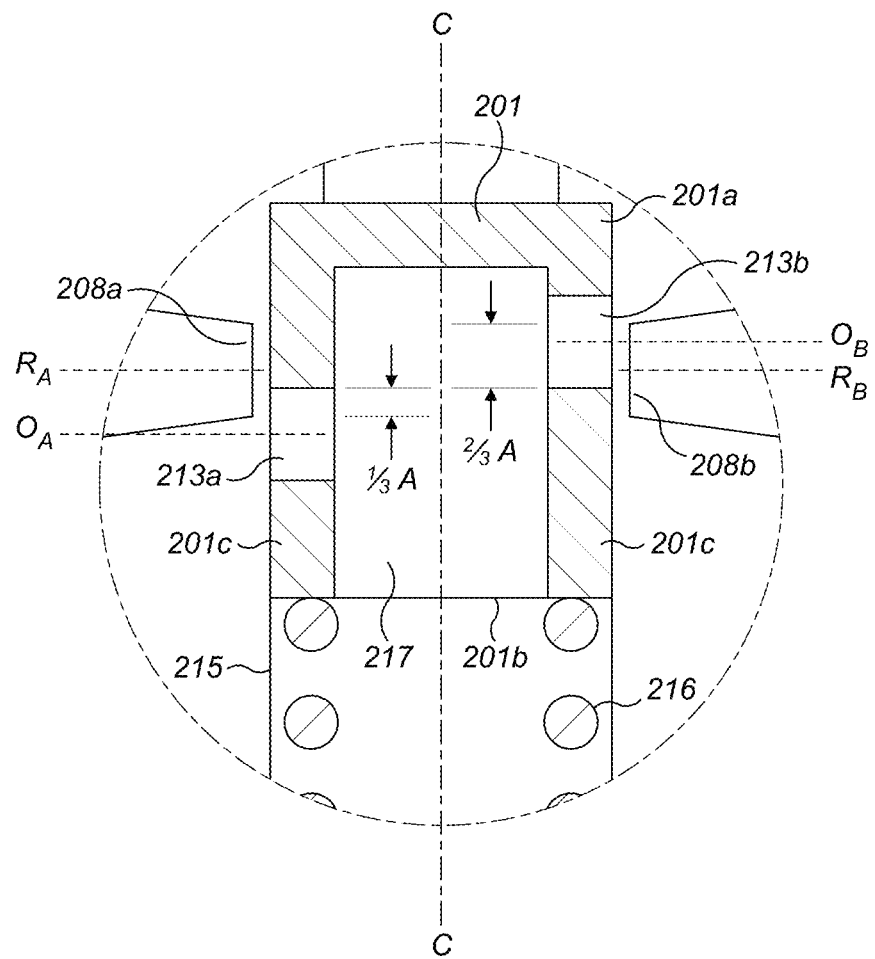

As shown in FIGS. 2a and 2b, when a neutral spool position is required, the piston 201 is positioned such that the openings 213a, 213b are communicating an equal proportion of fluid pressure to the receivers 208a, 208b. However, as shown in FIGS. 3a and 3b, when spool 203 is to be moved in order to actuate an actuator (not shown) downstream thereof (as discussed in relation to FIG. 1) the piston 201 is moved axially along axis C relative to the chamber 215, such that each receiver 208a, 208b is exposed to a different proportion of the openings 213a, 213b. In this manner, each receiver 208a, 208b receives a different amount of fluid pressure from openings 213a, 213b, and therefore a pressure imbalance is generated, which is communicated to chambers 204a, 204b and the spool 203, in order to move it (in the same manner as discussed in relation to FIG. 1).

In the depicted embodiment, the opposing receivers 208a, 208b have respective central axes $R_A$, $R_B$, and are co-axial with each other. Thus, in order to alter the proportions of openings 213a, 213b exposed to each receiver 208a, 208b, the central axes $O_A$, $O_B$ of the openings 213a, 213b are parallel, but axially offset from each other, such that they are not co-axial. In particular, the axes $O_A$, $O_B$ are offset from each other by a distance A. In the depicted embodiments shown in FIGS. 2b and 3b, distance A corresponds to the radius of the openings 213a, 213b, however, any suitable offset distance A can be used, as long as there exists a piston 201 position in which an equal proportion of each opening 213a, 213b is exposed to receiver 208a, 208b (i.e. a neutral position). The offset distance A can be adjusted depending on the sensitivity of the servo valve required (e.g. the amount of fluid pressure imbalance to be generated per amount of axial distance moved by the piston 201) and/or the total range of spool movement needed for the servo valve (i.e. the total range of fluid pressure imbalance that is required).

It is to be noted, however, that it is not necessary for the openings 213a, 213b to be offset in order to allow generation of the aforementioned neutral and fluid pressure imbalance positions. Equally, in alternative embodiments, the openings 213a, 213b may be co-axial, whilst the receivers 208a, 208b central axes $R_A$, $R_B$ are parallel to each other, but axially offset by a distance A instead.

The servo valve 20 comprises an actuator 202 configured to move the piston 201 within the chamber 215. The actuator 202 contacts the piston 201 against closed end 201a, and may be configured to exert a selectable and reversible bias on the piston 201 to enable it to be moved axially in chamber 215. In this manner, actuator 202 is used to move the piston 201 between a neutral position (shown in FIGS. 2a and 2b) and a position that generates a pressure imbalance (such as shown in FIGS. 3a and 3b), which is communicated to the receivers 208a, 208b, and consequently spool 203.

In the depicted embodiment, the actuator 202 contacts the piston 201 by touching closed end 201a. A resilient member, for example, a spring 216 contained within chamber 215 is used to contact and bias the piston 201 into position against the actuator 202, by pushing against the wall 201c at the open end 201b of the piston 201. In this manner, spring 216 allows piston 201 to be firmly pressed against the actuator 202, such that is does not move off-axis during use, and may also meter the movement of the piston 201 via actuator 202, to increase servo valve sensitivity. In alternative embodiments (not depicted), however, actuator 202 could instead be fixedly attached to the closed end 201a of the piston 201, in which case the use of spring 216 becomes optional. Depending on the type of actuator 202 used, such attachment could be made by any suitable technique, such as for instance, soldering or welding.

The actuated piston arrangement shown in FIGS. 2a to 3b may be contained within a housing 206.

In the depicted embodiment, the actuator 202 is a piezoelectric actuator 202. The piezoelectric actuator 202 is configured such that an electrical signal can be supplied thereto, for instance (in the depicted embodiment) using electrical input 205. In the depicted embodiment, the piezoelectric actuator 202 comprises a piezoelectric stack. As will be appreciated by one skilled in the art, application of an electrical signal (e.g. from electrical input 205) to the piezoelectric actuator 202 will result in a change in dimension in the piezoelectric material, which can be used to move piston 201 in an axial direction parallel with axis C. In this manner, energisation of the piezoelectric actuator 202 allows axial translation of the piston 201 along axis C. As will be understood by the skilled person, the degree of axial translation can be adjusted by varying the amount of voltage/current used to energise the piezoelectric actuator 202. In this manner, piezoelectric actuator 202 can be used to adjust the proportion of openings 213a, 213b supplying fluid pressure to the receivers 208a, 208b, in order to control the movement of spool 203 (as discussed above). Within the scope of this disclosure, any suitable type of piezoelectric actuator, including any suitable piezoelectric material, may be used. Since various piezoelectric actuators and materials are well-known in the art, specific embodiments of these do not warrant discussion.

It is to be appreciated that by replacing the jet pipe arrangement of the prior art with the actuated piston arrangement of the present disclosure, a more compact servo valve can be realised, which reduces weight, size and complexity. Such reductions in weight and size are particularly advantageous in aerospace applications. In addition, the actuated piston arrangement of the present disclosure may be more robust than a jet pipe arrangement (e.g. by featuring less fragile moving parts), and may overcome the aforementioned energy absorption, frequency and operating pressure limitations thereof. In particular, the use of a piezoelectric actuator 202 in combination with the piston 201 may allow for a particularly sensitive and responsive servo valve 20 that can make finer and more accurate adjustments than a servo valve controlled by a jet pipe arrangement, as well as operate at higher frequencies and operating pressures.

The invention claimed is:
1. A hydraulic servo valve comprising:
 a valve chamber;
 a pair of fluid receiving ports;
 a moveable member disposed between the pair of ports and movable within the valve chamber along an axis (C), wherein the moveable member comprises a pair of openings, each facing a respective one of the ports to permit fluid to flow from the valve chamber to the ports via the openings in use, wherein a fluid pressure at each of the ports is dependent upon an alignment of each of the openings with a respective one of the ports, and movement of the moveable member along the axis (C) is configured to move the openings into and out of alignment with the ports;

an actuator configured to move the moveable member within the valve chamber along the axis (C), so as to vary the fluid pressure at each of the fluid receiving ports;

a spool located within a spool cavity and between a first spool chamber and a second spool chamber, wherein the first spool chamber and the second spool chamber are of varying volume based on the position of the spool within the spool cavity;

a supply pressure inlet; and a supply line connecting the supply pressure inlet and the valve chamber;

wherein each port is fluidly connected to a respective one of the first and second spool chambers, such that, in use, when the actuator is actuated, the spool moves within the spool cavity to vary the volume of the first and second spool chambers in response to fluid pressure communicated from the ports.

2. The hydraulic servo valve of claim 1, wherein the actuator is a piezoelectric actuator.

3. The hydraulic servo valve of claim 1, wherein:
the openings have respective central axes ($O_A$, $O_B$) that are parallel to each other, but are axially offset from each other by an axial distance (A) relative to the axis (C); and
the opposing receiving ports are co-axial with each other.

4. The hydraulic servo valve of claim 1, wherein:
the receiving ports have respective central axes ($R_A$, $R_B$) that are parallel to each other, but are axially offset from each other by an axial distance (A) relative to the axis (C); and
the opposing openings are co-axial with each other.

5. The hydraulic servo valve of claim 1, further comprising an electrical input in electrical communication with the actuator, wherein the electrical input is controllable to selectively actuate the actuator.

6. The hydraulic servo valve of claim 1, further comprising a resilient member in contact with the movable member and configured to bias the movable member against the action of the actuator.

7. The hydraulic servo valve of claim 1, wherein the actuator is fixedly attached to the movable member.

8. The hydraulic servo valve of claim 7, wherein the attachment is provided by a solder joint or a weld between the actuator and the movable member.

9. The hydraulic servo valve of claim 1, wherein the movable member comprises a first wall forming a closed end of the movable member and a second wall extending axially from the first wall to define a cavity therebetween and an open end axially opposing the closed end.

10. The hydraulic servo valve of claim 9, wherein the first and second walls form a U-shaped cross-section.

11. The hydraulic servo valve of claim 1, wherein the servo valve further comprises:
a return line; and
at least one return control orifice disposed in the return line, wherein the at least one return control orifice comprises a constriction that is configured to control a fluid pressure in the return line.

12. The hydraulic servo valve of claim 11, wherein a supply control orifice is disposed in the supply line and the supply control orifice comprises a constriction that is configured to control a fluid pressure in the supply line.

13. The hydraulic servo valve of claim 12, wherein the constriction of the control orifice is an adjustable nozzle.

14. The hydraulic servo valve of claim 1, wherein the servo valve further comprises a housing containing the actuator, member and valve chamber.

* * * * *